(12) United States Patent
Williamowski et al.

(10) Patent No.: US 6,381,598 B1
(45) Date of Patent: *Apr. 30, 2002

(54) SYSTEM FOR PROVIDING CROSS-LINGUAL INFORMATION RETRIEVAL

(75) Inventors: Jutta Williamowski, Grenoble (FR); Uwe M. Borghoff, Hoehenkirchen (DE)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/218,431

(22) Filed: Dec. 22, 1998

(51) Int. Cl.[7] .................. G06F 17/30; G06F 17/27; G06F 17/28
(52) U.S. Cl. .................. 707/5; 707/532; 707/1
(58) Field of Search .................. 704/8; 707/1, 103, 707/532, 5, 104.1, 3.5

(56) References Cited

U.S. PATENT DOCUMENTS

| | | | |
|---|---|---|---|
| 5,426,583 A | | 6/1995 | Uribe-Echebarria Diaz De Mendibil .................. 364/419.08 |
| 5,450,598 A | | 9/1995 | Kaplan et al. .................. 395/800 |
| 5,564,058 A | | 10/1996 | Kaplan et al. .................. 395/800 |
| 5,581,780 A | | 12/1996 | Kaplan et al. .................. 395/800 |
| 5,594,641 A | * | 1/1997 | Kaplan et al. .................. 707/1 |
| 5,613,145 A | | 3/1997 | Kaplan et al. .................. 395/800 |
| 5,642,522 A | * | 6/1997 | Zaenen et al. .................. 707/532 |
| 5,805,832 A | * | 9/1998 | Brown et al. .................. 711/1 |
| 5,953,726 A | * | 9/1999 | Carter et al. .................. 707/103 |
| 6,092,036 A | * | 7/2000 | Hamann .................. 704/8 |

FOREIGN PATENT DOCUMENTS

| | | |
|---|---|---|
| EP | 0 838 765 A1 | 4/1998 |
| WO | WO 98/48359 | 10/1998 |
| WO | WO 98/48361 | 10/1998 |

OTHER PUBLICATIONS

Andreoli, J.M. et al., The Constraint–Based Knowledge Broker Model: Semantics, Implementation and Analysis, *J. Symbolic Computation*, (1996) 21, pp. 635–667.

Ballesteros, L. et al., Dictionary Methods for Cross–Lingual Information Retrieval, *Lecture Notes in Computer Science*, 1134, ISSN 0302–9743, pp. 791–801., 1996.

Rao, R. et al., System Components for Embedded Information Retrieval from Multiple Disparate Information Sources, *Proceedings of 1993 ACM Symposium on User Interface Software and Technology*, Atlanta, GA, Nov. 1993, ACM SIGGRAPH and SIGCHI.

European Search Report and Annex, Application No. EP 99 31 0220.

Hull, D. A., et al.: "Querying Across Languages: A Dictionary–Based Approach to Multilingual Information Retrieval", *Proceedings of the Annual International ACM SIGIR Conference on Research and Development in Information Retrieval*, US, New York, NY: ACM, vol. CONF. 19, 1996, pp. 49–57, XP000788309 ISBN: 0–89791–792–8 * p. 50, left–hand column, line 26–p. 52, left–hand column, line 6*.

(List continued on next page.)

*Primary Examiner*—Safet Metjahic
*Assistant Examiner*—Susan Chen
(74) *Attorney, Agent, or Firm*—Richard B. Domingo

(57) ABSTRACT

An information retrieval system providing for cross-lingual information retrieval. The method as implemented in the system causes elementary words to be extracted from a search expression. These elementary words are translated and stemmed into the target language(s). Searches are then made for documents containing combinations of the stemmed and translated elementary words. When documents are retrieved they are verified that they contain the same linguistic structure as the initial search expression. Documents that cannot be verified are eliminated from the set of search documents returned to the user.

13 Claims, 9 Drawing Sheets

OTHER PUBLICATIONS

Ballesteros, L., et al. "Phrasal Translation and Query Expansion Techniques for Cross–Language Information Retrieval", *Annual International ACM–SIGIR Conference n Research and Development in Information Retrieval*, US, New York, NY: ACM, 1997, pp. 84–91, XP000782005 ISBN: 0–89791–836–3 * p. 84, right–hand column, line 22—p. 85, right–hand column, line 48*.

* cited by examiner

FIG. 3

SYSTEM FOR PROVIDING CROSS-LINGUAL INFORMATION RETRIEVAL

FIELD OF THE INVENTION

The present invention is related to the searching of information repositories such as databases, and in particular to a facility for generating cross-lingual queries.

BACKGROUND OF THE INVENTION

Every day more information becomes available electronically over networks. Far from growing linearly, this growth is driven by numerous factors like the increasing accessibility to more media of information, the growing power of computers and networks, and the ever more data-intensive applications we are working with.

This gold mine of data however suffers from a lack of structure and consistency: the Web is unstructured and uncontrolled by nature, whereas structured databases use a widening variety of formats, either standardized or proprietary.

When accessing heterogeneous legacy databases on Intranets or while querying multiple information sources on the Internet, the end-user only wants to have a simple and straightforward point of access.

With classical tools, finding the right information to suit each user's needs is now the problem, for anything but the easiest of searches. The user must master different protocols; different database access methods; different document formats; and then use the information from one search to manually drive another. Thus, there is a need for information retrieval systems and approaches for easily interfacing into multiple information sources.

An exemplary information retrieval architecture is described in the article entitled "System Components For Embedded Information Retrieval From Multiple Disparate Information Sources", Ramana B. Rao, Daniel M. Russell, and Jock D. Mackinlay, Proceedings of 1993 ACM Symposium on User Interface Software and Technology, Atlanta, Ga, Nov. 1993 ACM SIGGRAPH and SIGCHI. The architecture incorporates an intermediary server which mediates access requests between an information access client (i.e. the user) and various information sources. Thus, the user only needs to interface with the information access client in order to retrieve the information from multiple information sources.

Another characteristic of information on the Web is that it can be in any language. Generally, a query only searches for items that are in the same language as the query. In situations where information found is in a different language, the reason is typically because the information contains a "word" that matches a search term. For example, a search for information on a famous person or event, may results in receiving information/documents in multiple languages.

However, what would be desirable is to obtain documents in different languages. So take for example a topic such as "trees". It would be desirable to translate the search term trees into the various languages in which documents would occur. A search may then retrieve information in those translated languages.

A dictionary based method for cross-lingual information retrieval is described by Lisa Ballesteros and Bruce Croft, "Dictionary Methods for Cross-Lingual Information Retrieval", Lecture Notes in Computer Science 1134 ISSN 0302-14 9743 (1996). The paper describes experiments which analyze the factors that affect dictionary based methods for cross-lingual retrieval and present methods that dramatically reduce the errors such an approach usually makes. The paper defines cross-lingual information retrieval as the ability to query in one language but perform retrieval across languages.

SUMMARY OF THE INVENTION

The invention relates to the searching of network accessible distributed databases, such as those found on the Internet. This invention enables a user to generate a query using search terms and expressions in their native language and to specify that the search results may include documents in other languages. With the query, the user indicates the target language in which results will be accepted. The system then processes the query using computational linguistic techniques and verifies the accuracy of the results received with respect to their language and the linguistic structure of the initial search terms. In a multi-word expression all combinations are verified automatically.

1. The method of the invention is comprised of the following steps: Split each multi-word search expression among the search terms into elementary words and suppress stopwords (and, the, etc.);

For each language in which documents will be retrieved:

2. determine for each resulting elementary word the stemmed translations, 2a. translate the elementary word into the target language; and 2b. stem the translated word;

3. search for documents containing one of the resulting combination of stemmed translations;

4. verify for each found document that the stemmed translations appear in the correct linguistic structure so that inappropriate results can be eliminated.

BRIEF DESCRIPTION OF THE DRAWINGS

FIGS. 2–3 illustrate simple and complex query windows as may be utilized in the currently preferred embodiment of the present invention.

DETAILED DESCRIPTION OF THE INVENTION

A portion of the disclosure of this patent document contains material which is subject to copyright protection.

The copyright owner has not objection to the facsimile reproduction by anyone of the patent document or the patent disclosure, as it appears in the Patent and Trademark Office patent file or records, but otherwise reserves all copyright rights whatsoever.

The present invention is directed to an interface for query generation to and information retrieval from one or more information sources. The currently preferred embodiment is implemented in an information retrieval system which provides software agents that can query multiple heterogeneous databases, re-construct information and generate customized reports. A description of the system is provided below, while a more comprehensive description as of the time of filing this application can be found at the following(Uniform Resource Locator) URL address on the World Wide Web (http:///www.xrce.xerox.com/research/ct/research/cbkb.html.

The present invention builds on the system by providing a facility to build dynamic complex queries. A dynamic complex query is one where query attribute specification is dynamic, rather than static, so that the results (or partial results) of one query can be used as an attribute specification by another query. Furthermore, the facility is made available to a user in a very intuitive fashion using well-known drag and drop graphical user interface methods.

The currently preferred embodiment of the present invention has implemented for use on computer based systems capable of accessing the World Wide Web (the Web) using a suitable Java™ enabled Web Browser. The various software programs utilized in the implementation are written in the well-known Java programming language.

Overview of the Information Retrieval System

Figure 1:
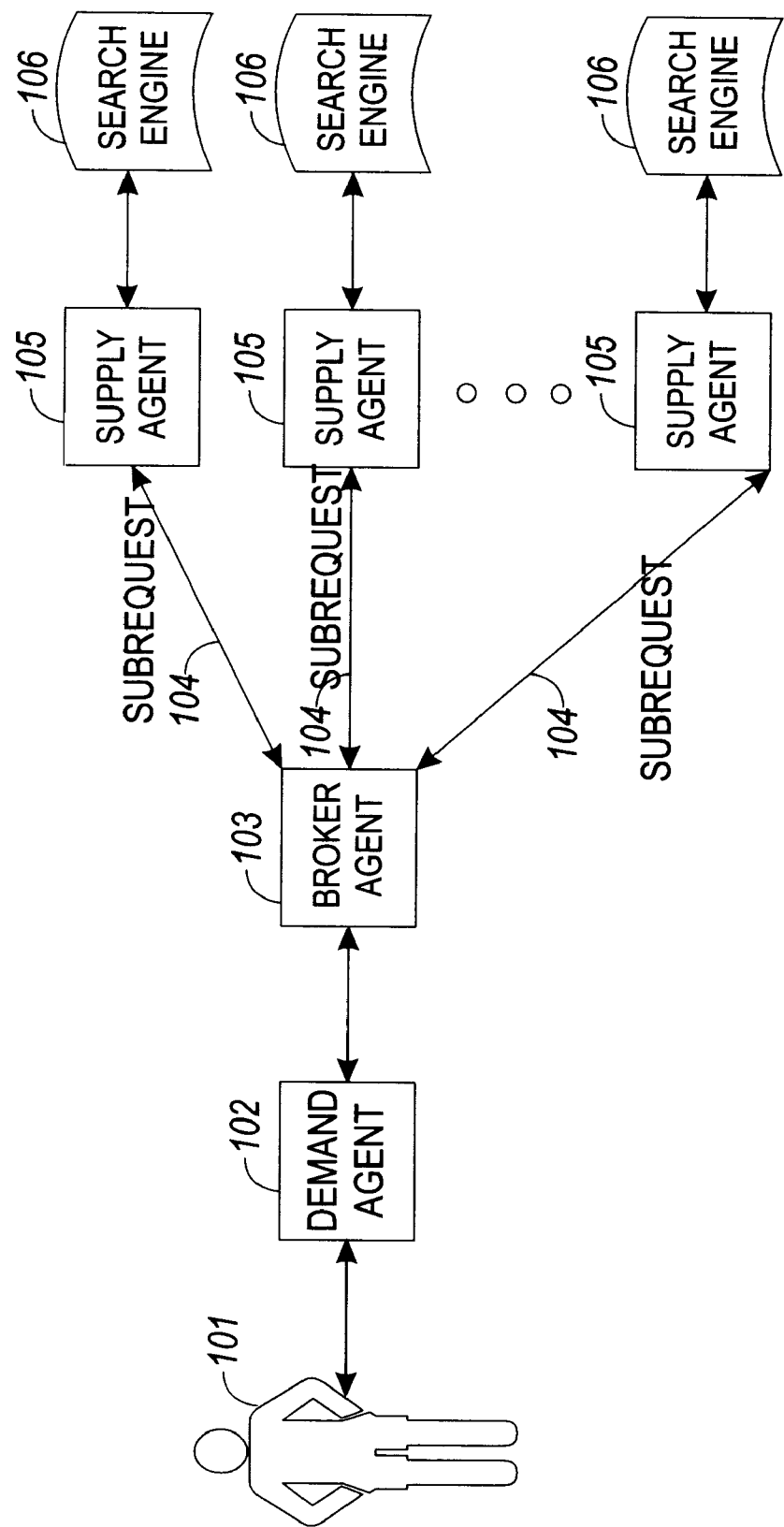
FIG. 1 is a block diagram illustrating the components of and process flow for an information retrieval system of the currently preferred embodiment of the present invention.

The amount of information available from electronic sources on the World Wide Web or other on-line information repositories is increasing exponentially. Tools are needed to extract relevant information from these repositories. The information retrieval system sophisticated facilities for efficient information retrieval and combination. FIG. 1 illustrates how information requests are processed in the information retrieval system. Referring to FIG. 1, a user 101 requests information through a Demand Agent, 102. The Demand Agent 102 typically embodies a User Interface which is presented to a User. In the currently preferred embodiment, the Demand Agent 102 is a Java™ Applet which is downloaded to User's personal computer system and is accessible using a suitably configured Web Browser (such as Netscape Navigator® having the appropriate Java™ software capabilities)

Demand Agents 102 will then present the information request to a Broker Agent 103. The Broker Agents 103 decompose information requests into interdependent subrequests 104. The requests or subrequests that cannot be further decomposed are fed into Supply Agents 105 that access electronic information repositories through search engines 106. The Supply Agents 105 will typically be configured to interface using the protocols of a particular search engine 106. For example, a Supply Agent may be provided to interface and make requests to the Alta Vista™ search engine. In the currently preferred embodiment, the Broker Agents and Supply Agents will operate on a Server system which provides information retrieval.

The results of the information request are received and then recomposed by the Broker Agent 103. It should be noted that the information retrieval system will provide for advanced querying facilities for the user not provided by some information sources, so the re-composition includes further filtering of the results to enable the advanced querying facilities. The recomposition may further include such tasks as formatting the received information and/or ranking the results with respect to the query request. Once the recomposition is completed, the results are returned to the Demand Agents 102 for presentation to the user 101.

It should be noted that preferably, requests, information and results are represented via feature constraints. Requests do not need to be fully defined; they may correspond to partial specifications of the requested information. Furthermore, requests that cannot be fully satisfied may still obtain results in the form of partial objects that refine the initial requests by instantiating some of its attributes or by adding new attributes, thus providing user feedback.

Various aspects of the information retrieval system can be found in the following PCT Publications WO 98/48359 (Oct. 29, 1998) and WO 98/48361 (Oct. 29, 1998).

Each of the various agents described above are preferably embodied as software programs, written in the Java programming language for execution on suitably configured computer based systems.

Information System User Interface

Figure 2:
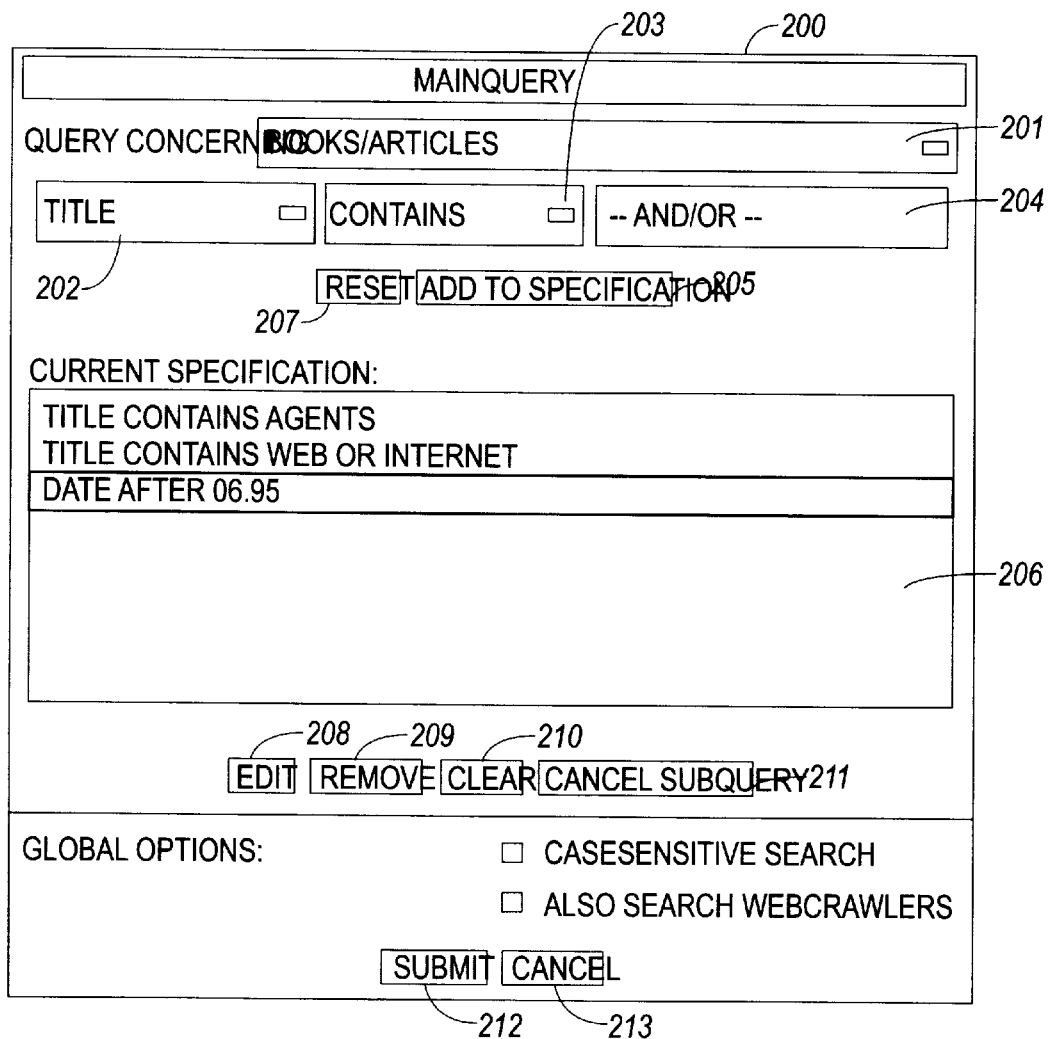

The Information System User Interface is typically presented to the user via the Demand Agent described above. FIG. 2 is an illustration of a query window for specifying a query. Referring to FIG. 2, a domain area 201 of query window 200 provides a means for specifying one of a plurality of predetermined domains for the query. The query domain relates to the type of information being sought. For example, a query domain may be a type of documents (e.g. books or articles) or a subject area (e.g. physics or operas). In the currently preferred embodiment, these domains are predefined and correspond to one or more information sources to which the query will be directed. The areas 202–204 provide for specifying a search pattern. The area 202 is for specifying a predetermined attribute (e.g. title or author). The area 203 is for specifying a constraint (e.g. contains or matches exactly) which is to be placed on the attribute and a specified keyword. The area 204 is for specifying a desired keyword(s), which may define an expression formed by keywords and Boolean operators. If the search pattern is correct, pressing the button 205 labeled "Add to the Specification" causes the pattern to be added to the current specification of the query, as indicated in specification area 206. If the search pattern is not correct, it can be reset using a reset button 207. The specification area 206 includes all the desired search patterns specified by the user.

Buttons 208–211 provide for editing the specification. Button 208 provides for editing a selected search pattern. Button 209 provides means for removing a search pattern. Button 210 provides means for clearing the entire specification. Button 211 provides for cancellation of a sub-query.

Finally, buttons 212–213, respectively, provide for the control of submission and cancellation of a query.

Figure 3:
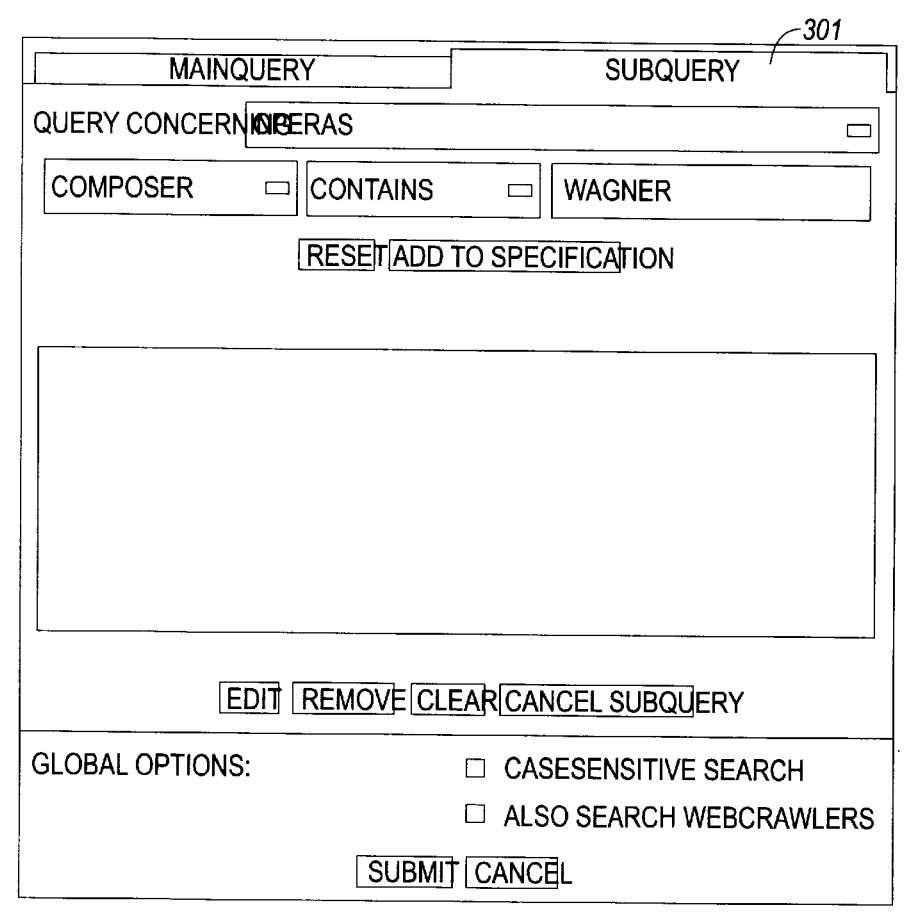

Finally, buttons 212–213, respectively, provide for the control of submission and cancellation of a query. FIG. 3 illustrates a window for performing a sub-query within a query, i.e. a complex query. In a complex query, a subquery generates a set of subresults. The results generated are subresults in the sense that they deliver values that will be used in the query patter of the mainquery (or in general a higher level query). A sub-query is provided for by selecting a predetermined option in the area 203, namely the "answer of" option. This causes the window of FIG. 3 to be displayed. As can be seen in FIG. 3, a new Tab 301 has been included to indicate that it is a sub-query. This also enables the user to traverse between the main query and the sub-query. Note that the rest of the sub-query window is similar to the main query.

Figure 4:
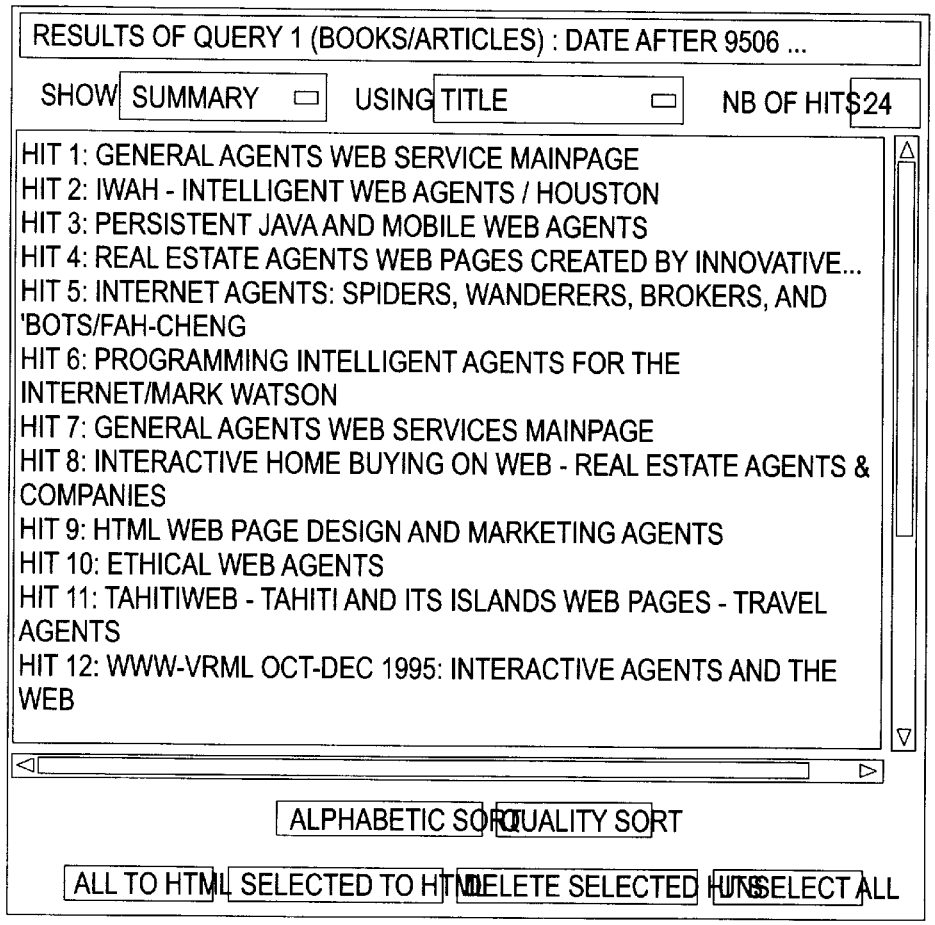
FIGS. 4 and 5 illustrate simple and complex result windows as may be utilized in the currently preferred embodiment of the present invention.
Figure 5:
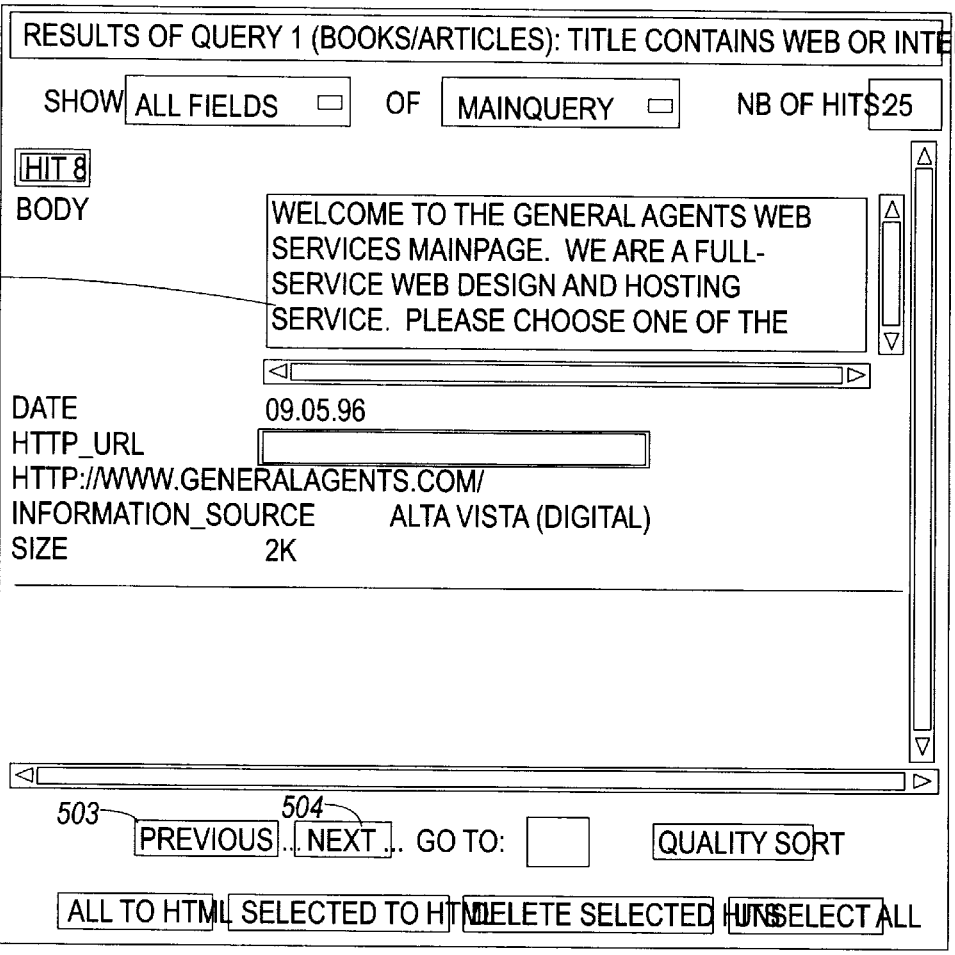

FIGS. 4 and 5 illustrate summary and detail views of the result window from a search. Referring to FIG. 4, a summary view shows a list of all the hits and some overall summary information such as the number of hits. In FIG. 5, all information fields relating to a particular "hit" are displayed. A body area 501 shows the textual content of the document. Information area 502 provides various information such as date, URL location, information source, size and title.

In this view, traversal through the list of hits is provided previous 503 and next 504 buttons provided within the window.

Cross-Lingual Queries

As described above, it would be desirable be able to retrieve documents containing the desired information, irrespective of the language of the query. The present invention provides such a facility through the ability to generate cross-lingual queries.

Figure 6:
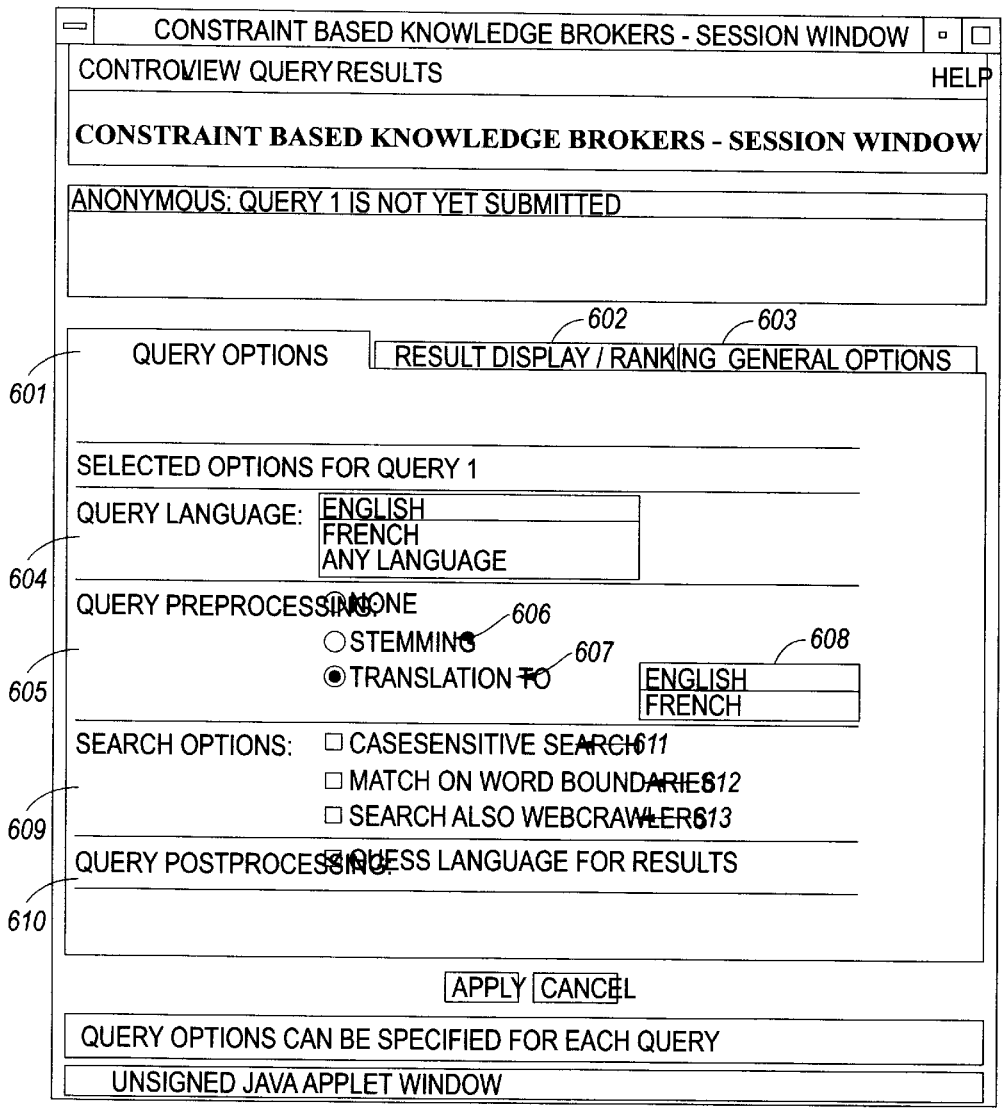
FIGS. 6–7 illustrate a window showing a user interface for specifying cross-lingual information retrieval as may be performed in the currently preferred embodiment of the present invention.

FIG. 6 illustrates a window wherein cross-lingual information retrieval can be specified. As with respect to the rest of the User Interface, the windows described herein would typically be presented to the user via the demand agent. Referring to FIG. 6, the control is provided through an interface wherein query options can be specified, here options panel 601. Other option panels could be accessed herein, such as a Result Display/Ranking panel 602 or General Options 603. In any event, a "Query Language" area 604 lets the user specify a query language. The query language specified will be the one in which search expressions are created. Generally, with the facility of the present invention, the query language selected is the one in which the user is most familiar. A second "Query Preprocessing" area 605 permits a user to specify query preprocessing options. Query preprocessing options are operations performed on the search expression prior to performing a search. Here the processing options are for stemming 606 or translation 607. Associated with the translation option 607 is a language specification area 608. In the language specification area 608, a user may select the languages into which the query may be translated.

Other query options illustrated include a search options area 609 and query postprocessing area 610. The search options area 609 includes options for a case sensitive search 611, matching on Word Boundaries 612, or for searching on Webcrawlers 613. Note that a Webcrawler is a particular type of search engine that performs an exhaustive search over many information sources. In the query postprocessing area, an operation to guess the language of the results 614 can be specified. Finally, buttons 615 and 616 permit a user to either apply or cancel the specified options.

Figure 7:
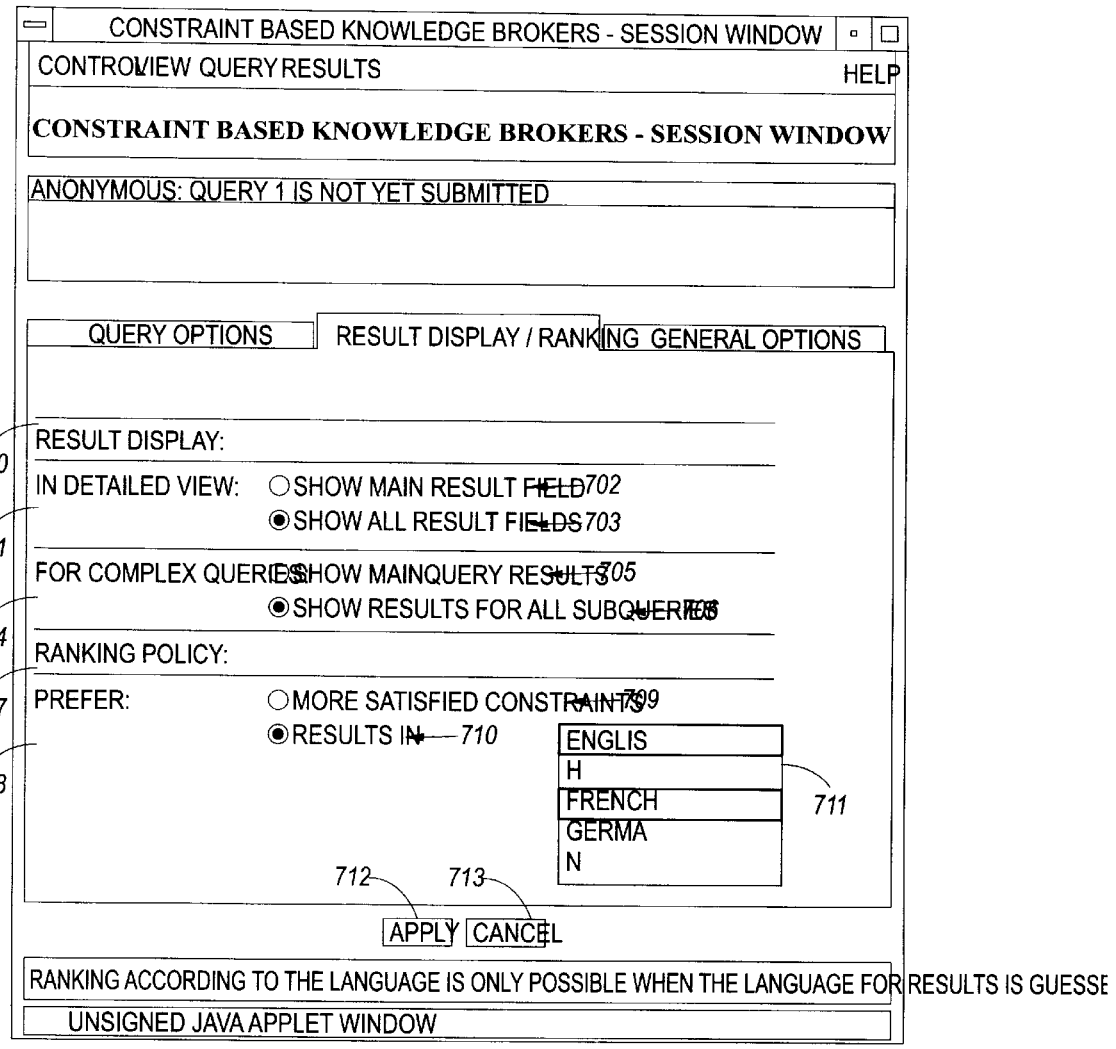

FIG. 7 illustrates the "Result Display/Ranking" panel 602 in more detail. Referring to FIG. 7, a "Result Display" area 700 has a first subarea titled "In Detailed View" area 701 which lets a user specify the information shown in the detailed view option (as illustrated in FIG. 5 above). Here the options are to show either the main result fields 702 or all the result fields 703. In "For Complex Queries" area 704, a user may specify showing the main query only 705 or the results for all the subqueries 706.

A "Ranking Policy" area 707 permits the user to specify how the results of the query are to be ranked. A subset of the Ranking Policy area 707 is a "Prefer" area 708 permits a user to specify that ranking is based on "more satisfied constraints" 709 and that a "Results in" area 710 which lets a user specify the language they desire the results to be in. Associated with the Results area 710 is a language specification area 711 wherein the user can specify the language or languages in which documents returned as results should be in. This specification also applies to how results are ranked. Finally, buttons 712 and 713 permit a user to either apply or cancel the specified options.

Figure 8:
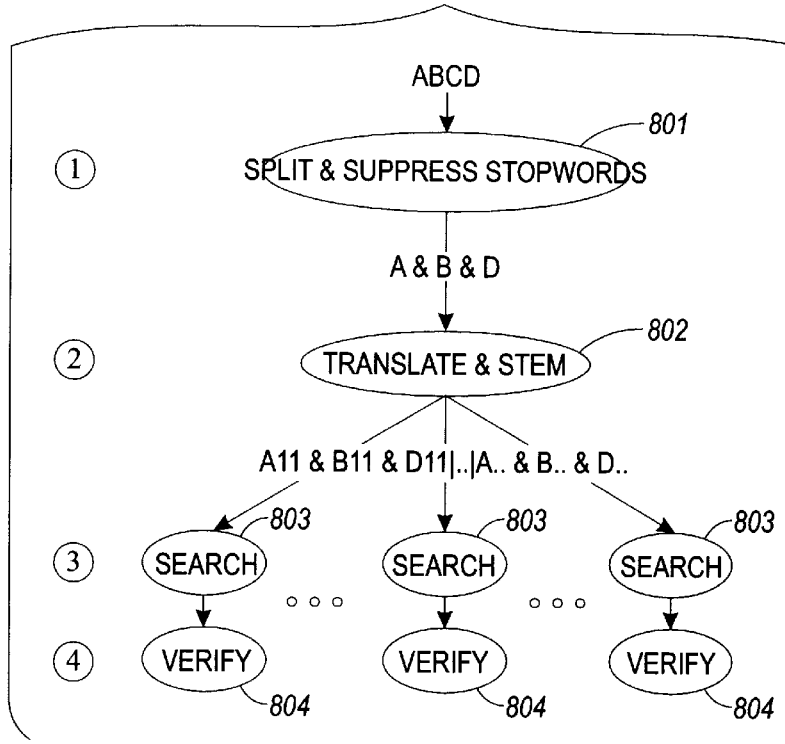
FIG. 8 is a diagrammatic representation of the method for cross-lingual information retrieval as may be performed in the currently preferred embodiment of the present invention.

FIG. 8 illustrates a diagrammatic representation of cross-lingual retrieval as may be performed in the present invention. Referring to FIG. 8, a search is requested for documents having the multiword search expression "ABCD" 801. At step 802, search expression is split into "elementary words" and "stop words" are suppressed (e.g. "and or "the"). Here A, B and D are elementary words and C is a stop word. Thus, only the elementary words A, B and D are provided for further processing. At step 803, the elementary words A, B and D are then translated and stemmed, resulting in a set of combinations of stemmed and translated elementary words.

Figure 9:
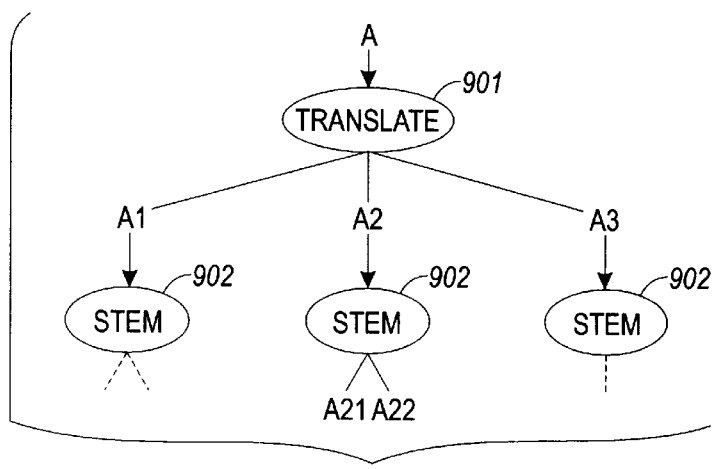
FIG. 9 is a diagrammatic representation showing a "translate and stem" step of the method of FIG. 8 as may be performed in the currently preferred embodiment of the present invention.

The translating and stemming is further illustrated in FIG. 9. Referring to FIG. 9, elementary word A is translated at process step 901, resulting in translations A1, A2 and A3. Each of the individual translations A1, A2 and A3 is stemmed at process step 902. Stemming is a process by which linguistic derivatives of a word are obtained. For example, the stemming of the word "focus" may result in the words "focused", "focusing", etc. In any event, as illustrated in FIG. 9 each of the stem and translated elementary words will result in multiple terms that will become part of search expressions.

The stemming and translation of the present invention may utilize the techniques as described in the following U.S. Patents: U.S. Pat. No. 5,450,598 "Finite-state machine data storage where data transition is accomplished without the use of pointers" issued Sep. 12, 1995, U.S. Pat. No. 5,581, 780 "Stored string data with next and alternative information a processor can use to reach next and alternative locations in memory" issued Dec. 3, 1996; U.S. Pat. No. 5,564,058 "Stored string data with encoded data units from sub-ranges of values that indicate search information" issued Oct. 8, 1996; U.S. Pat. No. 5,613,145 "Stored string data with element data units and pointer data units in distinct sub-ranges of values" issued Mar. 18, 1997; and U.S. Pat. No. 5,642,522 'Context-Sensitive Method of Finding Information About a Word in an Electronic Dictionary', issued Jun. 24th, 1997.

Referring back to FIG. 8, searches 803 are performed for documents containing at least one of the combinations of stemmed and translated elementary words. Preferably, concurrent searches are performed for each combination. Finally, verification process step 804 are performed on the results of each search. The verification process step is used to establish that the search expressions of the returned documents have the same linguistic structure as the original search expression. The techniques used in the verification step may be implemented using methods described in U.S. Pat. No. 5,426,583 to Uribe-Echebarria Diaz De Mendibil, entitled "Automatic Interlingual Translation System" (the '583 patent). However, the verification step of the present invention is much less ambitious than an automatic language translation system so the present invention is designed to handle less complete or complex features as for the automatic language translation needed in the '583 patent. It should be noted that the process steps performed with respect to FIGS. 8 and 9 would typically operate on either the demand agent or the broker agent or combinations thereof described above with respect to FIG. 1.

One of the main difficulties presented by the present invention is the handling of the numerous combinations resulting from the stemming and translation steps. Managing such combinations, internally modeled as interdependent complex queries, is one of the inherent features of the information retrieval system used by the present invention (see the aforementioned PCT Publications WO 98/48359 (Oct. 29, 1998) and WO 98/48361 (Oct. 29, 1998)). For example, each of the various combinations may be handled by the information retrieval system in which the present invention is implemented as a "sub-query" for a main query (which may perform a logical "OR" function to accumulate the results from all the sub-queries).

With respect to the number of generated combinations, as the information retrieval system of the currently preferred embodiment targets queries to limited domains (such as computer science), domain specific dictionaries are used to help reduce the amount of possible translations and thus of final combinations. Such domain specific dictionaries may only have definitions and translations that are specific to that particular domain. Also dictionaries of idiomatic expressions allow improving and focusing of the translation and thus possibly reducing the number of generated combinations.

Another important issue in information retrieval is the quality of the results obtained, measured by two standard parameters: precision and recall. The precision is defined as the number of relevant documents retrieved divided by the total number of documents retrieved; the recall as the number of relevant documents retrieved divided by the total number of relevant documents in the document base. In cross-lingual information retrieval the precision of the final search term itself, represented by the combination of stemmed translations, already suffers from the numerous results of the translation and stemming steps. Without some post-processing after the retrieval of documents, at least the precision of the retrieval result is obviously low. Therefore the last step of the method of the present invention plays a major role in improving the precision of queries. Of specific importance is the fact that the verification of the correct linguistic structure of the search keywords in the retrieved documents helps to eliminate inappropriate results.

Another technique for improving precision would be by user control of the results of the translation and stemming steps. This could be accomplished through the control mechanisms of query search channels described in co-pending application, Ser. No. 09/218,434, entitled "Search Channels Between Queries For Use In An Information Retrieval System". Using this technique, a first query might generate a plurality of search patterns, each corresponding to one of the combinations of translated stems. A search channel may be opened wherein a user can inspect the search results. If the user is familiar with the target language they might suppress some of the generated search terms based on the results received, e.g. by controlling and manually validating the generated search patterns or suppressing them if they are inappropriate.

Figure 10:
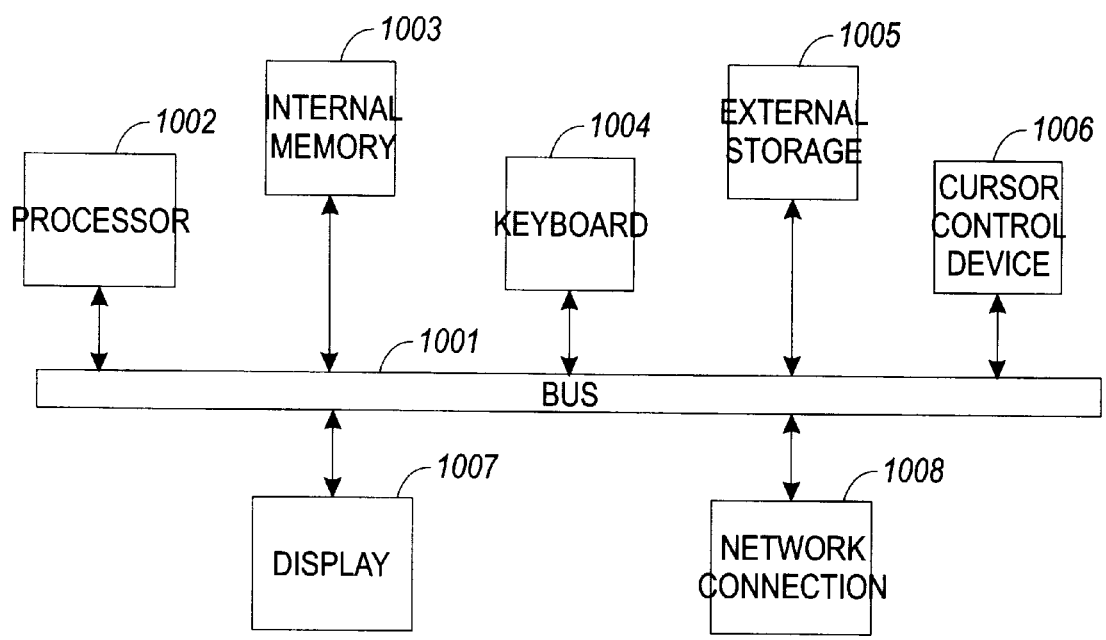
FIG. 10 is an illustration of a computer-based system as may be used to implement the currently preferred embodiment of the present invention.

Computer Based System of the Currently Preferred Embodiment of The Present Invention The computer based system on which the currently preferred embodiment of the present invention may be implemented is described with reference to FIG. 10. For example, the computer based system 10 may embody a user system upon which a demand agent executes and the user interface presented to a user, or it may be server system wherein the various broker and supply agents would execute. In any event, referring to FIG. 10, the computer based system is comprised of a plurality of components coupled via a bus 1001. The bus 1001 illustrated here is simplified in order not to obscure the present invention. The bus 1001 may consist of a plurality of parallel buses (e.g. address, data and status buses) as well as a hierarchy of buses (e.g. a processor bus, a local bus and an I/O bus). In any event, the computer system is further comprised of a processor 1002 for executing instructions provided via bus 1001 from Internal memory 1003 (note that the Internal memory 1003 is typically a combination of Random Access or Read Only Memories). The processor 1002 and Internal memory ROM 1003 may be discrete components or a single integrated device such as an Application Specification Integrated Circuit (ASIC) chip which has been designed to embody the functional features of the present invention.

Also coupled to the bus 1001 are a keyboard 1004 for entering alphanumeric input, external storage 1005 for storing data, a cursor control device 1006 for manipulating a cursor, and a display 1007 for displaying visual output. The keyboard 1004 would typically be a standard QWERTY keyboard but may also be telephone like keypad. The external storage 1005 may be fixed or removable magnetic or optical disk drive. The cursor control device 1006 will typically have a button or switch associated with it to which the performance of certain functions can be programmed. The network connection 1008 would be used to receive and/or transmit data containing a bit-mapped representation of a medium.

Thus, an information retrieval system having means for cross-lingual translation of search terms has been disclosed. While the present invention is described with respect to a preferred embodiment, it would be apparent to one skilled in the art to practice the present invention with other configurations of information retrieval systems. Such alternate embodiments would not cause departure from the spirit and scope of the present invention.

What is claimed is:

1. A method for generating a cross-lingual query in an information retrieval system, said method comprising the steps of:

a) receiving a search expression;

b) extracting one or more elementary words from said search expression;

c) determining stemmed translations for each of said one or more elementary words;

d) searching for and retrieving documents containing combinations of said stemmed translations;

e) verifying that the stemmed translations of elementary words in said retrieved documents have the same linguistic structure as the elementary words of said search expression; and discarding retrieved documents when the stemmed translation of elementary words in the documents does not have the same linguistic structure as the elementary words of said search expression.

2. The method as recited in claim 1 wherein prior to said searching and retrieving step, performing the step of creating combinations of said stemmed translations; and said searching and retrieving step is comprised of searching for documents having each of said created combinations of stemmed translations.

3. The method as recited in claim 2 wherein concurrent to said searching and retrieving step, performing the substeps of:

providing the user with interim search results associated with a particular combination of translated stems obtained during said searching and retrieving step; and receiving from said user, a signal to discontinue said search and retrieval step for said particular combination of translated stems.

4. The method as recited in claim 1 wherein said step of determining stemmed translations for each of said elementary words is comprised of the steps of:
- c1) translating an elementary word into a target language; and
- c2) stemming said translated elementary word.

5. The method as recited in claim 4 wherein said substep of translating an elementary word into a target language is accomplished using a domain specific dictionary.

6. The method as recited in claim 4 wherein said substep of translating an elementary word into a target language is accomplished using a dictionary of idiomatic expressions for said target language.

7. A system for cross-lingual information retrieval comprising:
- a demand agent providing:
  - a user interface for allowing a user to specify a search expression:
  - a query specification interface for allowing a user to specify that a query should be translated from a source language to a target language; a broker agent providing:
    - an expression splitting element for splitting a search expression into elementary words and stop words;
    - a translation element for translating elementary words into a target language;
    - it a stemming element for obtaining a linguistic stem for each of said translated elementary words;
    - a search specification element for generating search requests for each combination of stemmed and translated elementary words;
    - a verification element for verifying that the stemmed and translated elementary words in said returned documents have the same linguistic structure as the elementary words of said user specified search expression and discarding returned documents whose stemmed and translated elementary words do not have the same linguistic structure as the elementary words of said user specified search expression; and
  - a supply agent for receiving said search requests and requesting and obtaining documents from information sources responsive to said search requests.

8. The system as recited in claim 7 wherein said demand agent is further comprised of a user interface for allowing a user to specify a query domain.

9. The system as recited in claim 8 wherein said translation element is further comprised of a domain specific dictionary associated with a user specified query domain.

10. The system as recited in claim 8 wherein said translation element is further comprised of a dictionary of idiomatic expressions associated with said target language.

11. A program storage device readable by a machine, tangibly embodying a program of instructions executable by the machine to perform method steps for generating a cross-lingual query in an information retrieval system, said method comprising the steps of:
- a) receiving a search expression;
- b) extracting one or more elementary words from said search expression;
- c) determining stemmed translations for each of said one or more elementary words;
- d) searching for and retrieving documents containing combinations of said stemmed translations;
- e) verifying that the stemmed translations of elementary words in said retrieved documents have a linguistic structure associated with said one or more elementary words of said search expression; and
- f) discarding retrieved documents when the stemmed translation of elementary words in the retrieved documents does not have the same linguistic structure as the elementary words of said search expression.

12. The method as recited in claim 11 wherein prior to said searching and retrieving step, performing the step of creating combinations of said stemmed translations; and
- said searching and retrieving step is comprised of searching for documents having each of said created combinations of stemmed translations.

13. The method as recited in claim 11 wherein said step of determining stemmed translations for each of said elementary words is comprised of the steps of:
- c1) translating an elementary word into a target language; and
- c2) stemming said translated elementary word.

* * * * *